United States Patent [19]
Lee et al.

[11] Patent Number: 5,986,003
[45] Date of Patent: Nov. 16, 1999

[54] EXTRUDABLE VINYLIDENE CHLORIDE POLYMER COMPOSITIONS

[75] Inventors: Eric K. C. Lee, Midland; Steven R. Jenkins, Clare; Martin F. Debney; Carlos E. Hinton, both of Midland, all of Mich.

[73] Assignee: The Dow Chemical Company, Midland, Mich.

[21] Appl. No.: 08/961,176

[22] Filed: Oct. 30, 1997

[51] Int. Cl.⁶ ................................................. C08L 83/00
[52] U.S. Cl. ........................................... 525/104; 428/447
[58] Field of Search .......................... 524/506; 525/102, 525/104, 106

[56] References Cited

U.S. PATENT DOCUMENTS

| | | | |
|---|---|---|---|
| 4,028,431 | 6/1977 | Futami | 525/104 |
| 4,128,675 | 12/1978 | Rossler | 525/102 |
| 4,390,656 | 6/1983 | Weise | 524/506 |
| 4,412,039 | 10/1983 | Alberts | 525/106 |
| 4,434,272 | 2/1984 | Keogh | 525/104 |
| 4,446,090 | 5/1984 | Lovgren et al. | 264/211 |
| 4,965,136 | 10/1990 | Mueller | 525/104 |
| 5,115,029 | 5/1992 | Kirkpatrick et al. | 525/239 |

FOREIGN PATENT DOCUMENTS

WO 91/03518  3/1991  WIPO .

*Primary Examiner*—Paul R. Michl
*Attorney, Agent, or Firm*—Nemia C. Damocles

[57] ABSTRACT

A vinylidene chloride polymer composition comprising a vinylidene chloride polymer and a concentrate comprising a blend of a high viscosity, high molecular weight silicone polymer and a carrier polymer, e.g. high density polyethylene, the concentrate being present in an amount sufficient to improve the extrudability of the vinylidene chloride polymer. The vinylidene chloride composition can be fabricated into flexible and rigid containers, both in monolayer and multilayer structures for use in the preservation of food, drink medicine and other perishables.

29 Claims, No Drawings

EXTRUDABLE VINYLIDENE CHLORIDE POLYMER COMPOSITIONS

BACKGROUND OF THE INVENTION

This invention relates to vinylidene chloride polymer (PVDC) compositions having improved extrudability.

To control the generation of PVDC degradation products during melt processing, processing aids such as lubricants (e.g., internal and external types), olefinic waxes and oils have been blended with the vinylidene chloride polymer prior to fabrication into a final product. However, it has been found that, after prolonged periods of extrusion under desirable processing conditions, an excessive degree of adhesion develops between the vinylidene chloride polymer and the metal surfaces of the extruder screw and die. This adhesion increases the residence time of the vinylidene chloride polymer which promotes degradation, resulting in the formation of die face build up or die slough generation, and in the generation of carbon buildup on the screw and die metal surfaces It would be desirable to provide a vinylidene chloride polymer composition which is capable of being extruded, in either powder or pellet form, without having an unacceptable level of degradation which results from excessive adhesion between the PVDC melt and the screw and die metal surfaces.

SUMMARY OF THE INVENTION

In a first aspect, the present invention is a vinylidene chloride polymer (PVDC) composition comprising (1) a vinylidene chloride polymer and (2) a concentrate comprising a blend of a silicone polymer and a suitable carrier polymer in an amount sufficient to improve the extrudability of the vinylidene chloride polymer.

The inventors have discovered that adding a silicone/carrier polymer concentrate to PVDC improves the extrudability of the PVDC by reducing its degree of adhesion to the metal surfaces of the screw and die. The PVDC compositions of the present invention are considered to possess improved extrudability. As used herein, the term "improved extrudability" means that, if subjected to desirable processing conditions in an extruder, the polymer composition is less thermally sensitive and, consequently, the extrudate possesses a reduced level of degraded material in the form of die face buildup, slough generation and carbon buildup on extruder screw and die surfaces, reduced discoloration or less hydrogen chloride evolvement and a lower mechanical energy to extrude, i.e., amount of energy expended to extrude the polymer due to friction and the viscosity of the polymeric composition, than a PVDC composition which does not contain the silicone/carrier polymer concentrate.

DETAILED DESCRIPTION OF THE INVENTION

Vinylidene chloride polymers which can be employed in the practice of the present invention are well-known in the art. See, for example, U.S. Pat. Nos. 3,642,743 and 3,879,359. The most common PVDC resins are known as Saran™ resins, manufactured by The Dow Chemical Company. As used herein, the term "vinylidene chloride polymer" or "PVDC" encompasses homopolymers of vinylidene chloride, and also copolymers and terpolymers thereof, wherein the major component is vinylidene chloride and the remainder is one or more monoethylenically unsaturated monomer copolymerizable with the vinylidene chloride monomer. Monoethylenically unsaturated monomers which can be employed in the practice of the present invention for preparing the vinylidene chloride polymers include vinyl chloride, alkyl acrylates, alkyl methacrylates, acrylic acid, methacrylic acid, itaconic acid, acrylonitrile, methacrylonitrile, and the like. Preferred ethylenically unsaturated monomers include vinyl chloride, acrylonitrile, methacrylonitrile, alkyl acrylates, and alkyl methacrylates. More preferred ethylenically unsaturated monomers include vinyl chloride, acrylonitrile, methacrylonitrile, and the alkyl acrylates and alkyl methacrylates having from about 1 to about 8 carbon atoms per alkyl group. Most preferred ethylenically unsaturated monomers are vinyl chloride, methylacrylate, ethylacrylate, and methyl methacrylate.

Preferably, the vinylidene chloride polymer is formed from a monomer mixture comprising a vinylidene chloride monomer generally in the range of from about 60 to about 99 weight percent and the monoethylenically unsaturated comonomer in an amount of from about 40 to about 1 weight percent, said weight percents being based on total weight of the vinylidene chloride interpolymer. More preferably, the amount of monoethylenically unsaturated monomer is from about 40 to about 4 weight percent, and most preferably, from about 40 to about 6 weight percent, based on the total weight of the vinylidene chloride polymer.

The silicone/carrier polymer concentrate which can be employed in the practice of the present invention for preparing the vinylidene chloride polymer composition can be prepared by blending a silicone polymer and a carrier polymer (e.g. HDPE) in the melt using conventional melt processing techniques. Conventional melt processing equipment which may be used includes heated two-roll compounding mills, Brabender mixers, Banbury mixers, single screw extruders, twin screw extruders and the like. It is desirable that the silicone polymer and carrier polymer be blended under conditions and for a time sufficient to produce a visually homogeneous blend of the silicone polymer and carrier polymer.

The silicone polymers which can be employed in the practice of the present invention for preparing the concentrate include the high viscosity silicone fluids. The term "high viscosity silicone fluids" as used herein is intended to represent a wide range of polysiloxane materials having a high molecular weight. These high viscosity silicone fluids, often characterized as silicone gums, are comprised of about 20 to 100 percent siloxane polymers having an average molecular weight of about 50,000 or above and provide a viscosity of 90,000 centipoise and above at ambient temperature. Preferred polysiloxanes are polydimethyl siloxane, polydimethyldiphenyl siloxane and polymethyl alkyl aryl siloxane. It is known that these fluids are difficult to handle and feed into conventional blending equipment with solid thermoplastic polymers due to their high viscosity. See, for example, U.S. Pat. No. 4,446,090.

The amount of silicone polymer employed in the practice of the present invention for preparing the concentrate is from about 0.1 to about 99.9, preferably from about 10 to about 90 and, most preferably, from about 25 to about 75 weight percent, based on the weight of the concentrate.

The carrier polymers which can be employed in the practice of the present invention for preparing the concentrate are those which are known in the art for imparting beneficial properties to vinylidene chloride polymers, such as, for example, polyolefins, oxidized polyolefins, ethylene vinyl acetate copolymers, and acrylate copolymers. Preferably, the carrier polymer is a polyolefin, more preferably, a polyethylene and, most preferably, a high density polyethylene (HDPE).

The amount of carrier polymer employed in the practice of the present invention for preparing the concentrate is from about 0.1 to about 99.9, preferably from about 10 to about 90 and, most preferably, from about 25 to about 75 weight percent, based on the weight of the concentrate.

The most preferred silicone/carrier polymer concentrate is commercially available from Dow Corning as a 50/50 weight percent blend of a high viscosity, high molecular weight polydimethyl siloxane and HDPE.

In general, the vinylidene chloride polymer composition of the present invention can be prepared by melt blending the vinylidene chloride polymer with the silicone/carrier polymer concentrate using conventional melt processing techniques using the conventional melt processing equipment mentioned previously.

The silicone/carrier polymer concentrate of the present invention is typically blended with the vinylidene chloride polymer in an amount sufficient to provide from about 0.01 to about 10 weight percent silicone/carrier polymer concentrate in the blend. The amount of silicone polymer present in the vinylidene chloride polymer composition of the present invention depends on the composition of the vinylidene chloride polymer composition and the processing conditions to which the vinylidene chloride polymer composition is exposed. In general, the amount of silicone polymer present in the vinylidene chloride polymer composition is from about 0.005 to about 5.0, preferably from about 0.02 to about 0.2 and most preferably about 0.1 weight percent, based on the weight of the vinylidene chloride polymer composition.

The vinylidene chloride polymer composition of the present invention can be melt processed and extruded into any suitable final product, e.g., a variety of films or other articles. As is well known in the art, the films and articles are fabricated with conventional coextrusion; e.g, feedblock coextrusion, multimanifold die coextrusion, or combinations of the two; injection molding; co-injection molding; extrusion molding; casting; blowing; blow molding; calendering; and laminating.

Exemplary articles include blown and cast, mono and multilayer films rigid and flexible containers, rigid and foam sheet, tubes, pipes, rods, fibers, and various profiles. Lamination techniques are particularly suited to produce multi-ply sheets. As is known in the art, specific laminating techniques include fusion; i.e., whereby self-sustaining lamina are bonded together by applications of heat and pressure; wet combining, i.e., whereby two or more plies are laminated using a tie-coat adhesive, which is applied wet, the liquid driven off, and in one continuous process combining the plies by subsequent pressure lamination; or by heat reactivation, i.e., combining a precoated film with another film by heating, and reactivating the precoat adhesive so that it becomes receptive to bonding after subsequent pressure laminating.

The vinylidene chloride polymer compositions of the present invention are particularly suited for fabrication into flexible and rigid containers both in monolayer and multilayer structures used for the preservation of food, drink, medicine and other perishables. Such containers should have good mechanical properties, as well as low gas permeabilities to, for example, oxygen, carbon dioxide, water vapor, odor bodies or flavor bodies, hydrocarbons or agricultural chemicals.

The monolayer structures comprise the vinylidene chloride composition of the present invention.

The multilayer structure comprises (1) one or more layers of an organic polymer or a blend of two or more different organic polymers, the organic polymer of one layer being the same as or different from the organic polymer of another layer and (2) one or more layers of a vinylidene chloride polymer composition comprising a vinylidene chloride polymer and a concentrate comprising a blend of a high viscosity, high molecular weight silicone polymer and a carrier polymer, the concentrate being present in an amount sufficient to improve the extrudability of the vinylidene chloride polymer.

The multilayer structure can have three layers comprising (1) a first outer layer of the organic polymer or blend of two or more different organic polymers, (2) a core layer of the vinylidene chloride polymer composition and (3) a second outer layer of an organic polymer which is the same as or different from the organic polymer of the first outer layer.

Several variations of the three-layer structure include the following:

(a) A three-layer structure comprising (1) a first outer layer of the vinylidene chloride polymer composition, (2) a core layer of the organic polymer or blend of two or more different organic polymers and (3) a second outer layer of an organic polymer which is the same as or different from the organic polymer of the core layer.

(b) A three-layer structure comprising (1) a first outer layer of the vinylidene chloride polymer composition (2) a core layer of the organic polymer or blend of two or more different organic polymers and (3) a second outer layer of a vinylidene chloride polymer composition which is the same as or different from the vinylidene chloride composition of the first outer layer.

The multilayer structure can also have five or seven layers comprising one or more layers of the vinylidene chloride polymer composition of the present invention, and the remaining layers comprising an organic polymer or a blend of two or more different organic polymers, the organic polymer of one layer being the same as or different from the organic polymer of another layer.

The five-layer structure comprises (1) two outer layers of the vinylidene chloride polymer composition and (2) three core layers of the organic polymer or a blend of two or more different organic polymers, the organic polymer of one layer being the same as or different from the organic polymer of another layer.

The five-layer structure can also comprise (1) two outer layers of the organic polymer or a blend of two or more different organic polymers, the organic polymer of one layer being the same as or different from the organic polymer of the other layer and (2) three core layers of the vinylidene chloride polymer composition.

The seven-layer structure comprises (1) two outer layers of the vinylidene chloride polymer composition, (2) a first core layer of the organic polymer or blend of two or more different organic polymers, a second core layer of the vinylidene chloride polymer composition, (3) a third core layer of the organic polymer or blend of two or more different organic polymers, (4) a fourth core layer of the vinylidene chloride polymer composition and (5) a fifth core layer of the organic polymer or blend of two or more different organic polymers, the organic polymer of one layer being the same as or different from the organic polymer of another layer One or both of the outer layers of the described seven-layer structure can be replaced with an organic polymer or a blend of two or more different polymers.

Adhesive layers may be interposed between contiguous layers of the multilayer structures, depending on the composition and method of preparing the multilayer structure.

Organic polymers which can be used in the practice of the present invention for preparing the multilayer structure include polyolefins, polyamides, polymers based on aromatic monomers, and chlorinated polyolefins.

Polyolefins which can be employed in the practice of the present invention include, for example, low density polyethylene, linear low density polyethylene, very low density polyethylene, polypropylene (PP), polybutene, ethylene/vinyl acetate copolymers, ethylene/propylene copolymers ethylene/butene-1copolymers and polyethylene terephthalates and copolymers thereof.

Polymers based on aromatic monomers which can be employed in the practice of the present invention include polystyrene, polymethylstyrene, polyethylstyrene, styrene/methylstyrene copolymer, and styrene/chlorostyrene copolymer.

Polyamides which can be employed in the practice of the present invention include the various grades of nylon, such as nylon-6, nylon-66 and nylon 12.

Adhesive materials which can be employed in the practice of the present invention for preparing the adhesive layer include ethylene vinyl acetate copolymers, ethylene/ethyl acrylic acid ester copolymers, ionomers, modified polyolefins as described in U.S. Pat. No. 5,443,874, acrylic-based terpolymer adhesives as described in U.S. Pat. No. 3,753,769 and adhesives formed by reacting an epoxy resin and an acidified aminoethylated vinyl polymer as described in U.S. Pat. No. 4,447,494, the relevant portions of all three U.S. Patents are incorporated herein by reference. The more preferred adhesive materials are maleic anhydride grafted polyethylene or polypropylene such as ADMER (trademark of Mitsui Petrochemicals) adhesive resins, or ethylene-vinyl acetate copolymer resins such as ELVAX™ (trademark of DuPont). The most preferred adhesive material is ELVAX™ 3175, which is a 6 Melt Index, 28% vinyl acetate copolymer.

The thickness of the monolayer and multilayer structures of the present invention is variable within wide limits, depending on the contemplated application. In general, the monolayer structure of the present invention has a thickness of from about 0.05 to about 10 mils, preferably, from about 0.2 to about 6 mils, most preferably, from about 0.4 to about 1.8 mils. In general, the multilayer structure of the present invention has a thickness of from about 0.05 to about 200 mils, preferably from about 1 to about 100 mils, most preferably, from about 2 to about 80 mils, with the PVDC polymer layer having a thickness of from about 0.005 to 20 mils, preferably from about 0.2 to 10 mils, most preferably, from about 0.2 to 8.0 mils.

The present invention is illustrated in further detail by the following examples. The examples are for the purposes of illustration only, and are not to be construed as limiting the scope of the present invention. All parts and percentages are by weight unless otherwise specifically noted.

EXAMPLE 1

A 50/50 weight percent blend of high Mw poly(dimethyl siloxane) and high density polyethylene (supplied by Dow Corning as Extrusion Process Aid 50-020) is first ground into a powder (about 70 mesh). The following formulation containing the ground process aid is prepared:

100 parts of a vinylidene chloride/vinyl chloride copolymer containing about 20% by weight of vinyl chloride 0.125 part of ground Dow Corning Process Aid 50-020

0.1 part of oxidized polyethhylene wax (Allied Signal AC629A).

This formulation is then run on a 2.5 inch diameter extruder fitted with an annular die for observation of die face buildup versus a control material consisting of the above vinylidene chloride copolymer only. Extrusions of eleven hours in duration are performed for both samples with the following extrusion conditions:

Extruder rpm=25

Melt temperature=165 Celsius approx.

Extruder Pressure=2500 psi approx.

Extrusion screw parameter: 21 length to diameter ratio, 3.3:1 compression ratio.

The screw used has a one inch length of screw land in the metering section where the hard alloy is removed. This feature makes the screw especially prone to die face buildup and slough generation during extrusion.

For die face buildup and slough generation, the following is observed. The control gives severe die face buildup that requires hourly cleaning of the face of the die. There are depositions of dark brown colored die slough as well as carbon particles on the extrudate in frequencies greater than once per hour. For the formulation containing the high molecular weight poly(dimethyl siloxane) process aid, there is no dark colored die face buildup on the die, eliminating the need for die face cleaning. The incidence of die slough and carbon particles deposition on the extrudate is reduced to 3 times during the 11 hour extrusion, with the quantity of the deposits much reduced compared to the control.

Observation of the carbon generation on the extruder screw is made by crash cooling the screw and then examining the material "heel" on the screw a well as the screw surface at the end of the eleven hour extrusion. For the control, some carbon particles are found in the melt layers next to the barrel surface in flights number 5, 6, and 7, which were the beginning flights of the transition section of the screw. Also, carbon deposits are n the pushing flight as well as the surface of screw flight number 5. On the other hand, for the formulation containing the Dow Corning Extrusion Process aid, the entire screw surface was practically without any carbon deposits at the end of the extrusion.

The above working example shows the beneficial effects of reduced die face buildup and slough generation and reduced carbon generation on the screw by incorporation of the Dow Corning Process Aid in vinylidene chloride copolymers.

EXAMPLE 2

A comparison of the metal adhesion of the vinylidene chloride copolymer formulation in Example 1 containing the Dow Corning Process Aid 50-020 versus the control material without the same Process Aid is made by the forces needed to extract the extruder screw from the extruder barrel after crash cooling. The control formulation without the Dow Corning Process Aid 50-020 requires more than a 200 pound-force to extract, whereas a force of only about 20 pound-force is required for the experimental formulation containing the Dow Corning Process Aid 50-020.

The above example shows the effect of reduction of metal adhesion with the incorporation of the Dow Corning Process Aid into a vinylidene chloride polymer formulation.

EXAMPLE 3

The ability of the high molecular weight silicone/HDPE concentrate to increase the crystallization rate of vinylidene chloride polymers is shown by Differential Scanning Calorimetry (DSC). The following formulations of a vinylidene chloride copolymer (about 6 percent methyl acrylate, 94 percent vinylidene chloride) are first prepared using a high intensity blender:

| Control Formulation | |
| --- | --- |
| Vinylidene chloride copolymer | 100 parts |
| Epoxidized soybean oil | 1.0 part |
| Acetyl Tributyl Citrate | 5.0 parts |
| Experimental Formulation 1 | |
| Vinylidene chloride copolymer | 100 parts |
| Epoxidized soybean oil | 1.0 part |
| Acetyl Tributyl Citrate | 5.0 parts |
| Oxidized PE wax | 0.06 part |
| High Mw silicone/HDPE conc. | 0.08 part |
| Experimental Formulation 2 | |
| Vinylidene chloride copolymer | 100 parts |
| Epoxidized soybean oil | 1.0 part |
| Acetyl Tributyl Citrate | 5.0 parts |
| Oxidized PE wax | 0.1 part |
| High Mw silicone/HDPE conc. | 0.125 part |

The above formulations are then extruded into tapes using a 0.75 inch diameter extruder with a 20:1 length to diameter screw at a melt temperature of about 160 degrees Celsius. The extruded tapes are allowed to air cool to room temperature. The crystallization rate of the tapes are then measured by comparing the time to the peak of the crystallization exotherm in a differential scanning calorimeter (DSC). The starting temperature for the DSC scan is 50 degrees Celsius, with a temperature increase rate of 10 degrees Celsius/min.

The time to peak of the crystallization exotherm for the above three formulations are as follows, a shorter time indicating a faster crystallization rate:

| Sample | Time to Exotherm Peak (Min.) |
| --- | --- |
| Control | 4.49 |
| Exp. Formulation 1 | 3.33 |
| Exp. Formulation 2 | 2.76 |

The results indicate that the addition of high Mw silicone/HDPE concentrate to a vinylidene chloride polymer formulation increases its crystallization rate.

What is claimed is:

1. A composition comprising a blend of (1) a vinylidene chloride polymer formed from a monomer mixture wherein the major component is vinylidene chloride and the remainder is at least one monoethylenically unsaturated monomer copolymerizable therewith, and (2) a concentrate comprising a blend of a high viscosity, high molecular weight silicone polymer and a polyolefin carrier polymer, the concentrate being present in an amount sufficient to improve the extrudability of the vinylidene chloride polymer.

2. The composition of claim 1 wherein the vinylidene chloride polymer is formed from a monomer mixture comprising from about 60 to about 99 weight percent vinylidene chloride monomer and from about 40 to about 1 weight percent of a monoethylenically unsaturated comonomer copolymerizable therewith.

3. The composition of claim 2 wherein the monoethylenically unsaturated monomer is vinyl chloride, alkyl acrylate, alkyl methacrylate, acrylic acid, methacrylic acid, itaconic acid, acrylonitrile, or methacrylonitrile.

4. The composition of claim 1 wherein the concentrate is present in an amount of from about 0.01 to about 10 weight percent, based on the weight of the composition.

5. The composition of claim 5 wherein the silicone polymer is present in an amount of from about 0.001 to about 5 weight percent, based on the weight of the composition.

6. The composition of claim 1 wherein the silicone polymer has an average molecular weight of at least about 50,000 and a viscosity of at least about 90,000 centipoise at ambient temperature.

7. The composition of claim 6 wherein the silicone polymer is polydimethyl siloxane, polydimethyldiphenyl siloxane or polymethyl alkyl aryl siloxane.

8. The composition of claim 1 wherein the polyolefin is a high density polyethylene, low density polyethylene, linear low density polyethylene, very low density polyethylene, polypropylene, polybutene, ethylene/vinyl acetate copolymers, ethylene/propylene copolymers, ethylene/butene-1 copolymers or polyethylene terephthalates or copolymers thereof.

9. The composition of claim 8 wherein the concentrate comprises a blend of from about 0.1 to about 99.9 silicone and from about 99.9 to about 0.1 weight percent high density polyethylene.

10. The composition of claim 8 wherein the concentrate comprises a blend of from about 10 to about 90 weight percent silicone and from about 90 to about 10 weight percent high density polyethylene.

11. The composition of claim 8 wherein the concentrate comprises a blend of from about 25 to about 75 weight percent weight percent silicone and from about 75 to about 25 weight percent high density polyethylene.

12. The composition of claim 8 wherein the concentrate comprises a blend of 50 weight percent polydimethyl siloxane and 50 weight percent high density polyethylene, based on the weight of the concentrate.

13. A monolayer structure comprising a blend of (1) a vinylidene chloride polymer formed from a monomer mixture wherein the major component is vinylidene chloride and the remainder is at least one monoethylenically unsaturated monomer copolymerizable therewith, and (2) a concentrate comprising a blend of a high viscosity, high molecular weight silicone polymer and a polyolefin carrier polymer, the concentrate being present in an amount sufficient to improve the extrudability of the vinylidene chloride polymer.

14. A multilayer structure comprising (1) one or more layers of an organic polymer or a blend of two or more different organic polymers, the organic polymer of one layer being the same as or different from the organic polymer of another layer and (2) one or more layers of a composition comprising a blend of vinylidene chloride polymer and a concentrate comprising a blend of a high viscosity, high molecular weight silicone polymer and a polyolefin carrier polymer, the concentrate being present in an amount sufficient to improve the extrudability of the vinylidene chloride polymer.

15. The multilayer structure of claim 14 comprising (1) a first outer layer of the organic polymer or blend of two or more different organic polymers, (2) a core layer of the vinylidene chloride polymer composition and (3) a second outer layer of an organic polymer which is the same as or different from the organic polymer of the first outer layer.

16. The multilayer structure of claim 14 comprising (1) a first outer layer of the vinylidene chloride polymer composition, (2) a core layer of the organic polymer or blend of two or more different organic polymers and (3) a second outer layer of an organic polymer which is the same as or different from the organic polymer of the core layer.

17. The multilayer structure of claim 14 comprising (1) a first outer layer of the vinylidene chloride polymer composition, (2) a core layer of the organic polymer or blend of two or more different organic polymers and (3) a second outer layer of a vinylidene chloride polymer composition which is the same as or different from the vinylidene chloride polymer composition of the first outer layer.

18. The multilayer structure of claim 14 wherein an adhesive layer is interposed between contiguous layers of the multilayer structure.

19. The multilayer structure of claim 14 wherein the organic polymer is a polyolefin, a polyamide or a polystyrene.

20. The multilayer structure of claim 14 wherein the polyolefin is high density polyethylene low density polyethylene, linear low density polyethylene, very low density polyethylene, polypropylene, polybutene, ethylene/vinyl acetate copolymers, ethylene/propylene copolymers ethylene/butene-1 copolymers or polyethylene terephthalates or copolymers thereof.

21. The multilayer structure of claim 14 having a thickness of from about 0.05 to about 200 mils.

22. A five-layer or seven-layer structure having (1) one or more layers of a composition comprising a blend of a vinylidene chloride polymer formed from a monomer mixture wherein the major component is vinylidene chloride and the remainder is at least one monoethylenically unsaturated monomer copolymerizable therewith, and a concentrate comprising a blend of a high viscosity, high molecular weight silicone polymer and a polyolefin carrier polymer the concentrate being present in an amount sufficient to improve the extrudability of the vinylidene chloride polymer and (2) the remaining layers comprising an organic polymer or a blend of two or more different organic polymers, the organic polymer of one layer being the same as or different from the organic polymer of another layer.

23. The five-layer structure of claim 22 comprising (1) two outer layers of the vinylidene chloride polymer composition and (2) three core layers of the organic polymer or a blend of two or more different organic polymers, the organic polymer of one layer being the same as or different from the organic polymer of another layer.

24. The five-layer structure of claim 22 comprising (1) two outer layers of the organic polymer or a blend of two or more different organic polymers, the organic polymer of one layer being the same as or different from the organic polymer of the other layer and (2) three core layers of the vinylidene chloride polymer composition.

25. The seven-layer structure of claim 22 comprising (1) two outer layers of the vinylidene chloride polymer composition, (2) a first core layer of the organic polymer or blend of two or more different organic polymers, a second core layer of the vinylidene chloride polymer composition, (3) a third core layer of the organic polymer or blend of two or more different organic polymers, (4) a fourth core layer of the vinylidene chloride polymer composition and (5) a fifth core layer of the organic polymer or blend of two or more different organic polymers, the organic polymer of one layer being the same as or different from the organic polymer of another layer.

26. The seven-layer structure of claim 25 wherein one or both of the outer layer(s) are replaced with an organic polymer or a blend of two or more different organic polymers.

27. The five-layer or seven-layer structure of claim 21 wherein an adhesive layer is interposed between contiguous layers of the film.

28. A rigid container comprising the monolayer structure of claim 13.

29. A rigid container comprising the multilayer structure of claim 14.

* * * * *